United States Patent [19]

Arnold

[11] Patent Number: 4,680,922
[45] Date of Patent: Jul. 21, 1987

[54] MOWER

[75] Inventor: William T. Arnold, Sutton West, Canada

[73] Assignee: Brouwer Turf Equipment Limited, Keswick, Canada

[21] Appl. No.: 857,281

[22] Filed: Apr. 30, 1986

Related U.S. Application Data

[62] Division of Ser. No. 685,502, Dec. 24, 1984, Pat. No. 4,644,737.

[51] Int. Cl.⁴ .......................................... A01D 35/24
[52] U.S. Cl. ......................................... 56/7; 56/249
[58] Field of Search ................ 56/6, 7, 12.7, 13.6, 56/15.2, 15.3, 249, 294

[56] References Cited

U.S. PATENT DOCUMENTS

| | | |
|---|---|---|
| 2,191,135 | 2/1940 | Roth ............................... 56/7 |
| 3,106,811 | 10/1963 | Heth et al. ..................... 56/7 |
| 3,616,626 | 11/1971 | Branley et al. ................ 56/7 |
| 3,731,469 | 5/1973 | Akgulian et al. .............. 56/7 |
| 4,021,996 | 5/1977 | Bartlett et al. ................ 56/7 |
| 4,384,443 | 5/1983 | Hoogstrate .................... 56/7 |
| 4,546,601 | 10/1985 | Skouhoj ....................... 56/249 |

Primary Examiner—Robert Peshock
Assistant Examiner—John G. Weiss
Attorney, Agent, or Firm—Rogers, Bereskin & Parr

[57] ABSTRACT

A mower having a frame consisting of a top plate and downwardly extending side plates. Reel adjustment members are pivotably connected to the side plates and carry the ends of the reel shaft to adjust the reel position. A bed knife behind the reel is carried by two side arms which extend upwardly and forwardly to the front and top of the mower. The side arms are pivoted at their rear to the frame side plates and are joined at their tops by a transverse bar. The transverse bar is adjustably connected to the frame top plate by an adjustment device to adjust the bed knife position. The rear roller is carried by further side arms also pivoted to the frame side plates and connected at their tops by a second transverse bar which is connected by an adjustment device to the frame top plate. The mower is suspended at its center and drive is applied through a shaft extending over the mower generally parallel to the reel axis, to prevent torque changes from varying the height of an end of the mower.

7 Claims, 10 Drawing Figures

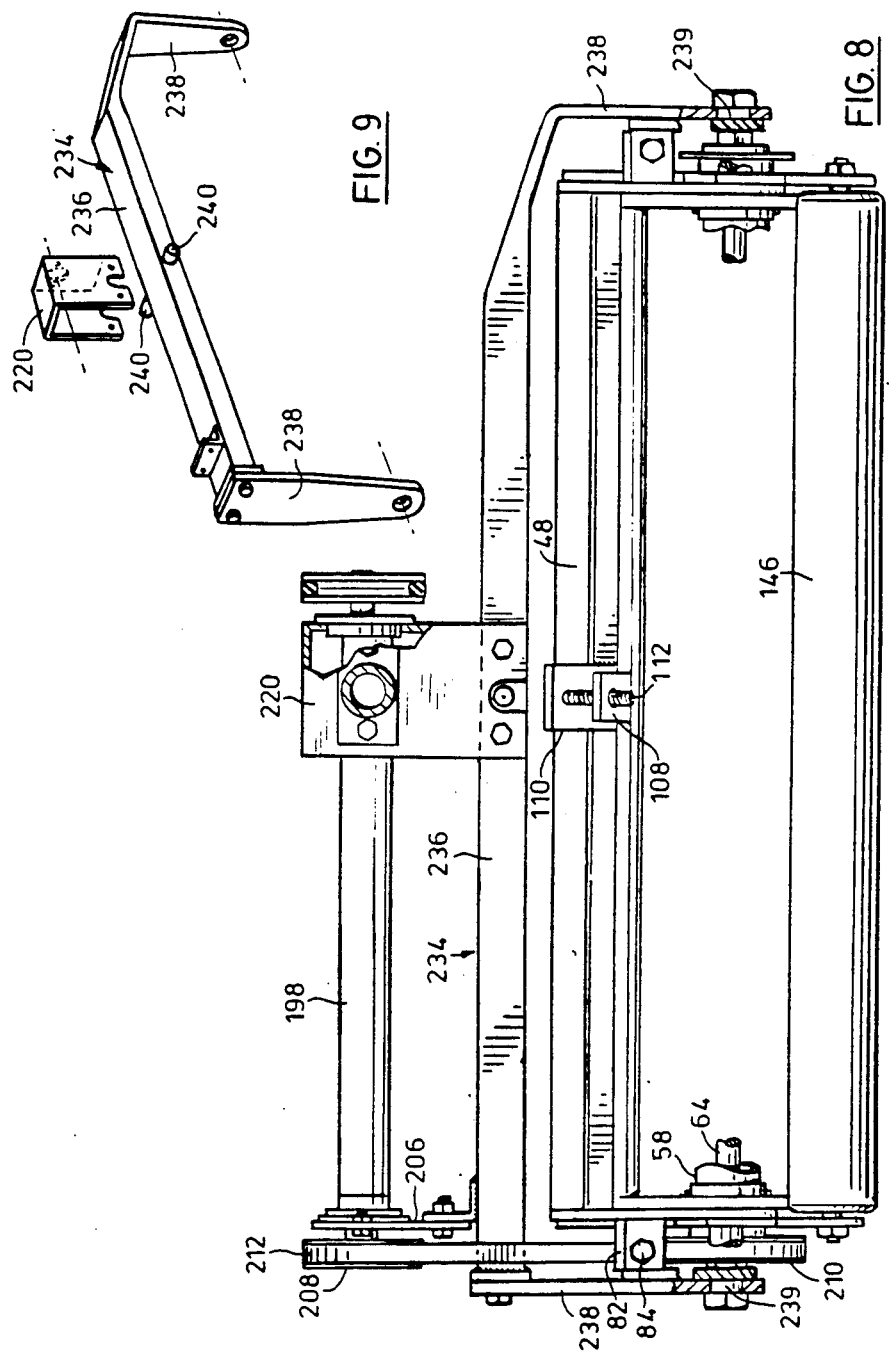

MOWER

This application is a divisional of my co-pending U.S. application Ser. No. 685,502 filed Dec. 24, 1984 now U.S. Pat. No. 4,644,737 entitled MOWER.

This invention relates to an improved mower for cutting grass.

Mowers for cutting grass commonly have a reel and a bed knife. The reel must be adjusted precisely with respect to the bed knife along the entire length of the bed knife, so that grass is cut without undue wear on the reel and bed knife. Ideally the blades of the reel will pass extremely closely to the bed knife along the entire length of the bed knife, without quite touching the bed knife, so as to cut blades of grass projecting between the two. If the reel touches the bed knife at any point, and particularly if there is any substantial interference, accelerated wear of the reel and bed knife will occur. This greatly shortens the interval between sharpenings of the mower and also substantially reduces the life of both the reel and bed knife. Since sharpening a reel type mower is difficult, time consuming and expensive, and since both the reel and bed knife (particularly the reel) are expensive to replace, it is desirable that the reel and bed knife be adjusted as precisely as possible. Such adjustments must be accurate to within a few thousands of an inch.

Accordingly, it is an object of the invention in one of its aspects to provide a mower in which simple and extremely accurate adjustment of the relative positions of the reel and bed knife can be achieved. Moreover, the primary adjusting mechanism is located adjacent the top of the mower where it will not obstruct the flow of grass from the reel and cause clogging of the reel. Accordingly in one of its objects the invention provides a mower comprising:

(a) a frame, said frame comprising a top member and two side members one at each side of said top member and depending downwardly therefrom, said side members being rigidly connected to said top member,
(b) a reel,
(c) means mounting said reel for rotary movement relative to said frame and including reel adjustment means mounted between at least one end of said reel and said frame for adjusting the position of each end of said reel relative to said frame,
(d) a bed knife assembly comprising:
  (i) a bed knife positioned behind said reel,
  (ii) two side arms one connected to each end of said bed knife and extending upwardly to a position adjacent the top of said mower,
  (iii) an upper transverse member connecting said upper ends of said side arms together,
(e) pivot means pivotally connecting said bed knife assembly to said frame at a position adjacent said bed knife, and
(f) adjustment means connected between said bed knife assembly and said frame for pivoting said bed knife assembly about said pivot means to adjust the position of said bed knife relative to said reel.

In another aspect the invention provides an improved drive arrangement for a power driven reel mower. It has long been a difficulty with power driven reel type mowers, where power is applied to one end of the reel by a drive belt, that as soon as the mower encounters longer grass, more torque is applied to the mower and one end of the mower is forced downwardly or upwardly. If several mowers are arranged side-by-side in a gang mower, this causes a visible line between adjacent mowers. To avoid this difficulty others previously have used cable or electric drives, which are costly, or hydraulic drives which are not only costly but also are extremely wasteful in power usage.

Therefore in another of its aspects the invention provides a drive system for a mower, in which a belt drive is provided to one end of the mower reel and yet increased torque in the drive system does not force one end of the mower downwardly or upwardly. According to this aspect of the invention there is provided a mower comprising:

(a) a frame,
(b) a reel mounted in said frame for rotation therein,
(c) a bed knife mounted on said frame and located behind said reel to cut grass between said reel and said bed knife,
(d) a first upstanding support adjacent one end of said mower and extending above said frame,
(e) a second upstanding support adjacent the center of said mower and extending above said frame,
(f) means rigidly connecting said upstanding supports together and coupling said supports to said frame,
(g) a drive shaft extending across the top of said mower and through said supports,
(h) a pulley connected to said drive shaft adjacent said first support, a pulley connected to said reel and drive belt means connected between said pulleys, and
(i) drive means connected to said drive shaft adjacent the center of said mower for rotating said drive shaft.

Further objects and advantages of the invention will appear from the following description, taken together with the accompanying drawings in which:

FIG. 8 is a front view of a mower similar to that of FIG. 7 but having a further modified mounting arrangement;

FIG. 9 is a perspective view of a mounting bar of FIGS. 7 and 8; and

Figure 1:
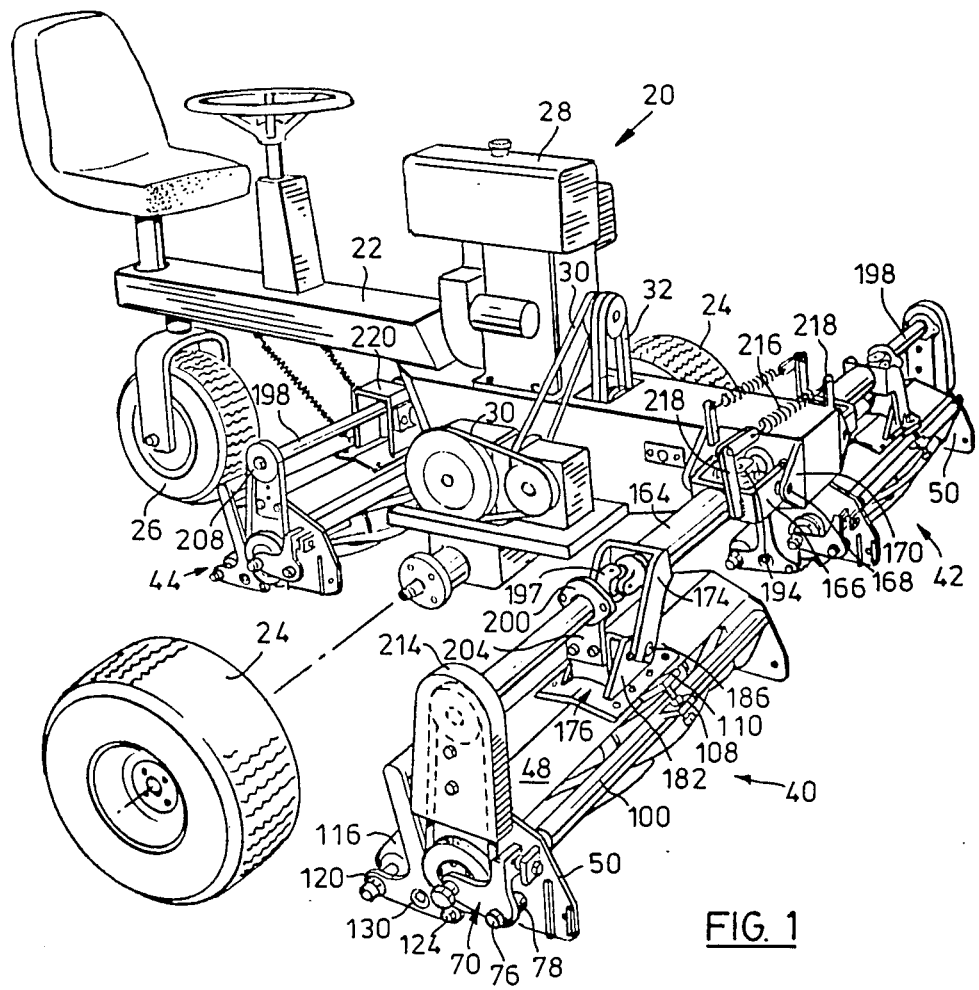
FIG. 1 is a perspective view of an exemplary support and propulsion vehicle fitted with mowers according to the invention.
Figure 2:
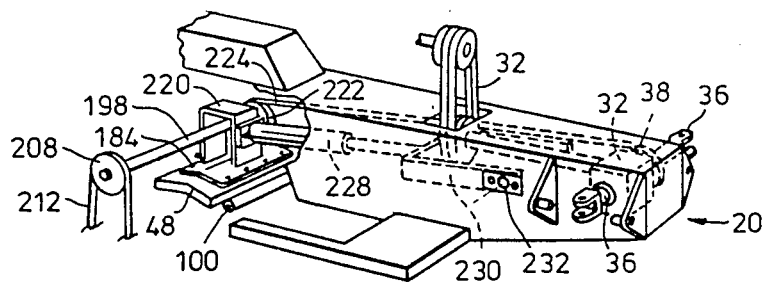
FIG. 2 is a perspective view of the drive system of the FIG. 1 vehicle.

Reference is first made to FIGS. 1 and 2, which show an exemplary conventional support and propulsion vehicle 20 fitted with mowers according to the invention. The vehicle 20 includes a frame 22, two front drive wheels 24, a rear steering wheel 26, and an engine 28. A belt 30 transmits power to the drive wheels 24, and belts 32 transmit power to a "T" gearbox 34 (FIG. 2). Shafts 36 and a pulley 38 from the gearbox 34 transmit power to the mowers which are the subject of this invention.

The vehicles 20 carries two front mowers 40, 42 and a rear central mower 44. All of the mowers are of the same basic construction, which will now be described with reference to FIGS. 3 to 6 inclusive.

FIGS. 3 to 6 show the mower 40. Mower 40 comprises a frame 46 consisting of a top member 48 and two side plates 50. The side plates 50 are welded to and extend downwardly at each side of the top member 48. Each side plate 50 is roughly U-shaped in plan view, having a central downwardly opening slot 54 (FIG. 6) to accommodate a reel 56.

The reel 56 is conventional and comprises (see particularly FIGS. 3 and 5) an axially extending tube 58 having laterally spaced discs 60 mounted thereon to support the reel blades 62. An axially extending shaft 64 extends through the center of tube 58 and supports the tube 58 for rotation thereon by bearings 66 (FIG. 5) mounted between the two.

Each end of the shaft 64 is supported by (see FIG. 3) an L-shaped reel mounting arm 68 having legs 70, 72. The shaft 64 passes through the free end of each leg 70 and is fixed thereto by a bolt 74. The inner end of leg 70 is pivotally mounted by bolt 76 and boss 78 on each side plate 50. The second leg 72 of reel mounting arm 68 extends upwardly from bolt 76 and carries a laterally inwardly extending projection 80 at its upper end. Each side plate 50 includes a laterally outwardly extending projection 82 spaced forwardly of projection 80 and located adjacent the top of the mower. An adjustment bolt 84 extends through an unthreaded hole 85 in projection 82 and into a threaded hole in projection 80 and is secured in any preset position by nut 86. By turning the bolts 84, the position of the ends of the reel 56 can be adjusted in the arc indicated by arrows 86, about pivot bolts 76. Because the threads on adjustment bolts 84 are fine, this provides a fine adjustment for each end of the reel as will be described. (If desired, one end of the reel can be non-adjustably retained and adjustment provided only for the other end. However adjustment at both ends is preferred.)

Figure 6:
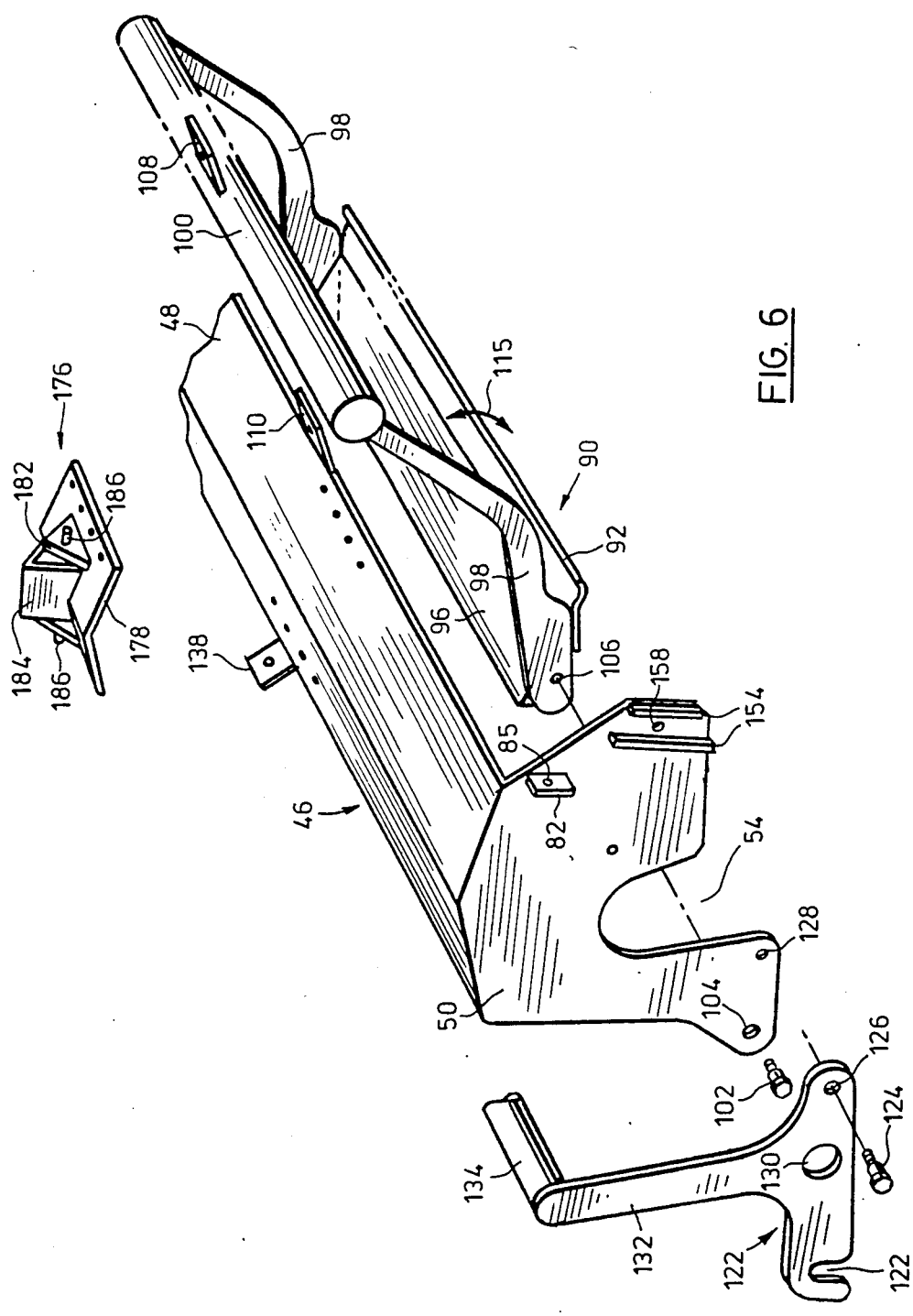
FIG. 6 is an exploded perspective view of certain major parts of the mower of FIGS. 3 to 5.
Figure 7:
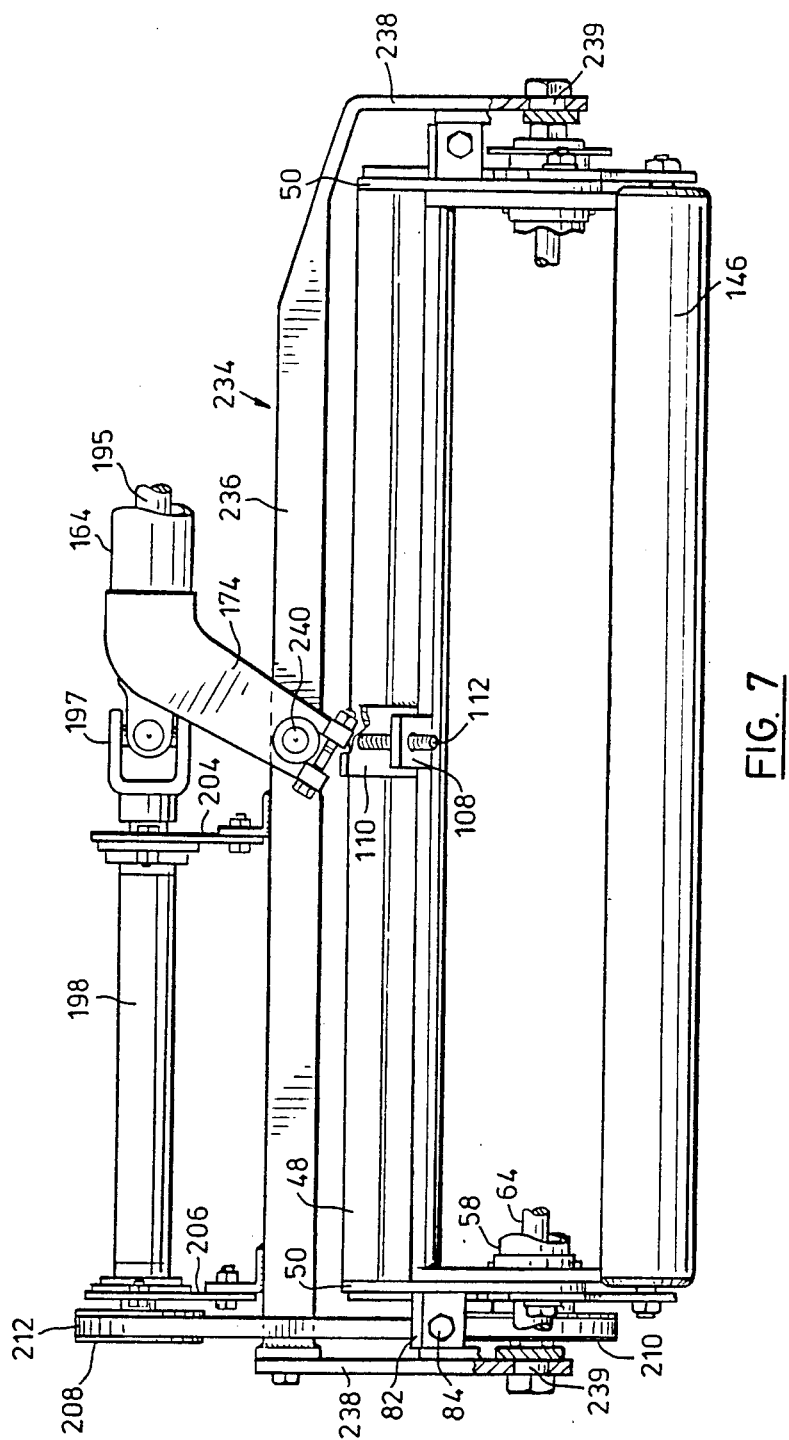
FIG. 7 is a front view of a mower similar to that of FIGS. 3 to 5 but having a modified mounting arrangement.
Figure 10:
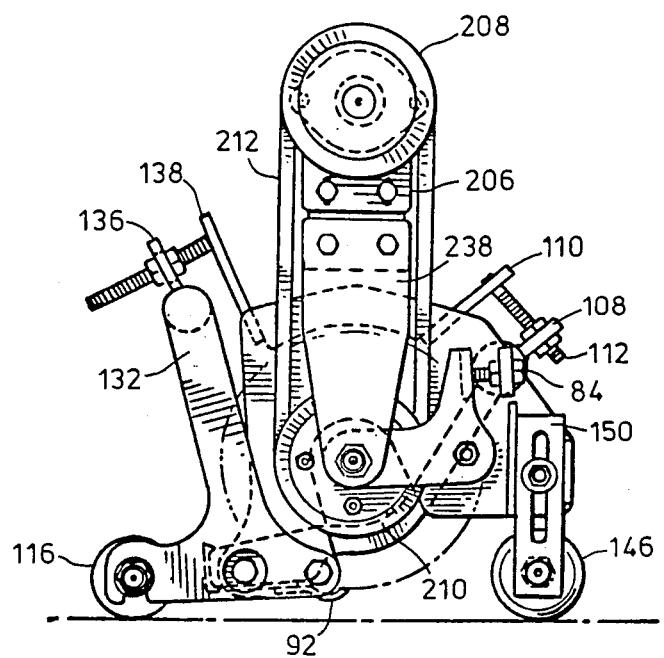
FIG. 10 is an end view of the mower of FIG. 9.

The mower 20 also includes a bed knife assembly 90 (FIG. 6). The bed knife assembly includes a bed knife 92 against which the reel 56 cuts grass. The bed knife 92 is secured by screws 94 to the underside of a triangular bed member 96 which extends transversely along the width of the mower.

A bed kife mounting arm 98 is welded to each end of the bed member 96. Each bed knife mounting arm 98 extends forwardly and upwardly, at a position laterally within the frame side plates 50, to a position adjacent the top and front of the mower. At this location the bed knife mounting arms 98 are connected together by a heavy transverse bar 100.

At its rear, each bed knife mounting arm 98 is pivotably secured to its associated frame side plate 50 by a bolt 102. Bolt 102 extends through a hole 104 in side plate 50 and into a threaded hole 106 in arm 98.

Adjustment of the position of the bed knife 92 relative to the reel 56 is achieved as follows. As shown, the transverse bar 100 includes an upwardly and forwardly slanting leg 108. A similar leg 110 extends upwardly and forwardly from the frame top member 48. An adjustment bolt 112 is welded to leg 110 and extends through a hole in leg 108 and is held in any desired position by a pair of nuts 114. When the position of the bed knife is to be adjusted, one of the nuts 112 is loosened and the other nut 112 is tightened to move the bed knife 92 in an arc indicated by arrows 115 about pivot bolts 102.

To adjust the bed knife and reel to their correct operating positions, bolt 112 is first adjusted to bring the bed knife 92 to a position spaced fairly closely to the reel 56. Then end bolts 84 are adjusted to provide an accurate adjustment of the position of each end of the reel 56 relative to the bed knife 92. Once this has been done and once bolts 84 have been locked, then as wear occurs, only the single bolt 112 need be adjusted under normal operating conditions to bring the bed knife 92 and reel 56 closer together.

It will be also noted that the adjustment of bolt 112 does not push directly on the center of the bed knife 92. It is extremely important to avoid pushing directly on the center of the bed knife or its support, since the forces generated in such manner tend to distort the bed knife if only by a few thousands of an inch. Such distortion is sufficient to affect seriously the evenness of the cutting. With the adjustment arrangement as shown in the drawings, the position of the bed knife is adjusted by pivoting the arms 98 which are connected to each end of the bed member 96, thereby reducing the likelihood of distorting the bed knife.

It is also an important feature of one aspect of the invention that the adjustment bolt 112 is located adjacent the top of the mower and transmits its movement via arms located at the sides of the mower, so that it will not interfere with grass thrown out by the mower. This helps to prevent clogging of the mower, and thereby also helps to prevent the consequent deterioration of the cut achieved and the resultant potential damage to the mower.

Although an adjustment bolt 112 is shown for providing easy adjustment of the position of the bed knife relative to the reel, it will be appreciated that any conventional suitable adjustment means can be connected between the legs 108, 110 to provide quick adjustment of the spacing between them in small steps without the need for tools. The long lever arm constituted by arms 98 (which extend from the rear of the bed knife to the front and top of the mower) facilitates adjustment of the bed knife position in fine increments.

If desired the adjustment means between the bed knife assembly 90 and the mower frame 46 could be at one side of the mower, e.g. between one side arm 96 and a frame side plate 50 (preferably near the top). However a central location as shown is far preferable, since then both ends of the bed knife assembly are equally rigidly held.

The cutting height of the mower is controlled by adjusting the height of a rear roller 116. A shaft (not separately shown) rotatably supporting the rear roller 116 is secured by nuts 120 in the slots 122 of two rear roller side plates 124. Each rear roller side plate lies over the outside of its associated frame side plate 50 and is pivoted at its forward end to such frame side plate 50 by a bolt 124. The bolt 124 extends through a hole 126 (FIG. 6) in roller side plate 122 into a threaded hole 128 in the frame side plate 50. A relatively large hole 130 in each rear roller side plate 122 provides a clearance for the head of the bolt 102 which pivotably secures the bed knife assembly 90 to its associated frame side plate 50.

Each rear roller side plate 122 includes an upwardly extending arm 132. The tops of arms 132 are connected by a heavy transverse bar 134 having a central upwardly extending leg 136 thereon. A similar leg 138 extends upwardly and rearwardly from the center of the top plate 48, lying parallel to and spaced from the leg 136. A roller adjustment bolt 140 is welded to leg 138 and extends through a hole in leg 136, being secured in position by two nuts 142. Thus, as the positions of nuts 142 are adjusted on the bolt 140, the rear roller side arms 132 will pivot as indicated by arrows 144 about bolts 124, raising and lowering the rear roller 116 relative to the bed knife 92 and thereby adjusting the cutting height of the mower. Again any conventional quick adjustment device may be substituted for the bolt 140 to allow adjustment of the mower cutting height without tools. It will be noted that because the cutting height adjustment device is located at the top of the mower and transmits its motion down the sides of the mower, again it does not interfere with the stream of grass leaving the mower and therefore will not cause clogging or potential damage to the mower. In addition a single adjustment adjusts the height of both sides of the rear roller 116.

Although the bed knife mounting arms 98 have been shown as extending forwardly to the front of the mower, they can instead extend upwardly and rearwardly and can be connected by a transverse bar in the position of the transverse bar 134 used to adjust the height of the rear roller 116 (in which case bar 134 would have to have a higher location or else a different rear roller height adjustment mechanism, e.g. like that used for the front roller to be described, would be used). However it is preferred that the bed knife mounting arms 98 extend forwardly and that the rear pivot bolts 102 for the bed knife mounting arms be located as far rearwardly as possible, to provide as long a lever arm as possible between transverse bar 100 and pivot bolts 102 (to facilitate fine adjustment of the bed knife position).

Figure 3:
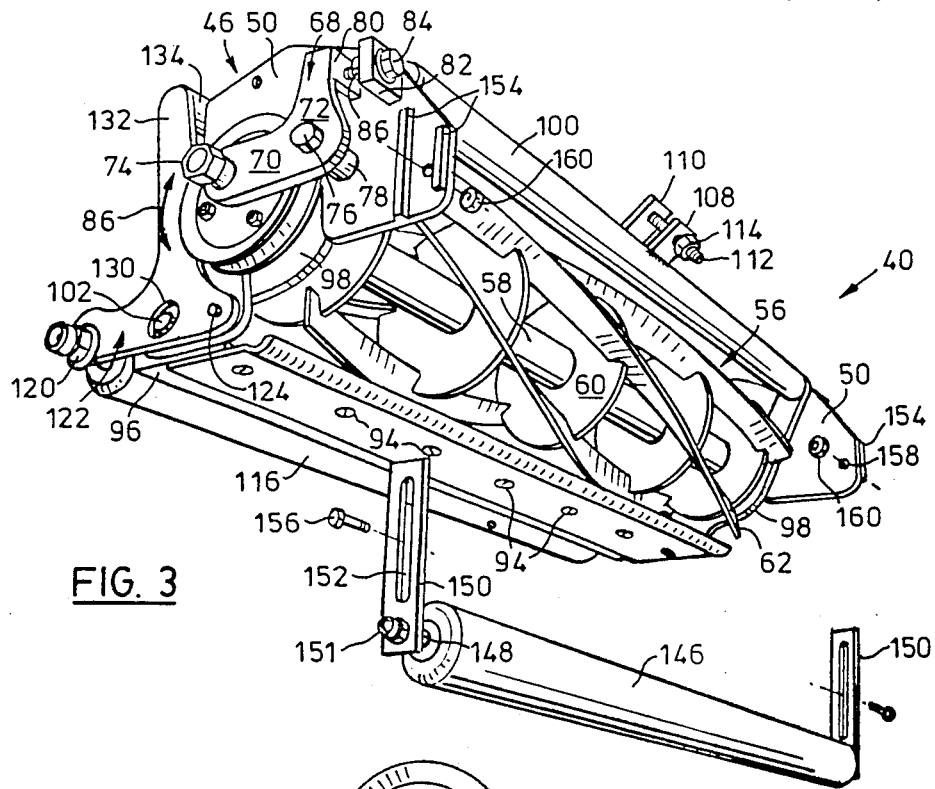
FIG. 3 is a perspective view, partly exploded, of a mower according to the invention.

In some applications of the mower a front roller 146 may be used. The rotating central shaft 148 of front roller 146 is shown in FIG. 3 simply as being mounted on vertically extending side brackets 150 by nuts 151. Each side bracket 150 contains a slot 152 therein and is dimensioned to slide vertically between two vertical spaced ridges 154 on the exterior of each frame side plate 50, at the front of the frame. A bolt 156 extends through the slot 152 into a hole 158 in the frame side plate 50, and is secured thereto by a nut 160, to adjust the height of the front roller 146.

Figure 4:
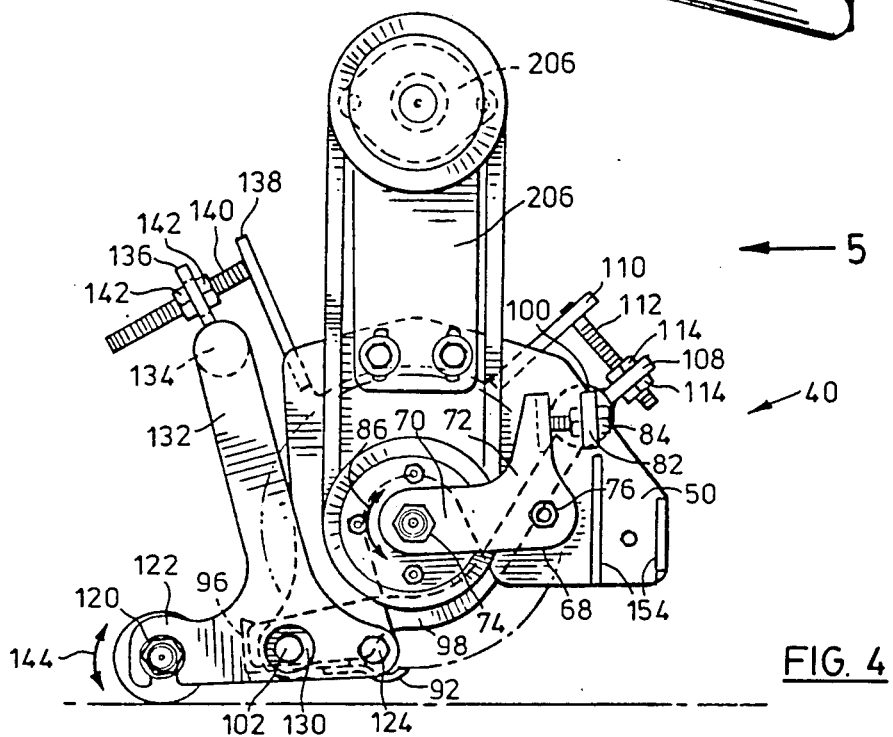
FIG. 4 is an end view of the mower of FIG. 3.

The manner in which the mowers 40, 42, 44 are mounted and driven will next be described, firstly with reference to FIGS. 1, 4 and 5. It is an important feature of the invention in one of its aspects that the drive for the mower is through a shaft extending over the top of the mower and generally parallel to the axis of the mower. It is found that this arrangement, unlike conventional mechanical drives, reduces the likelihood that variations in torque will cause one end of the mower to be forced downwardly or upwardly, creating an uneven cut.

Figure 5:
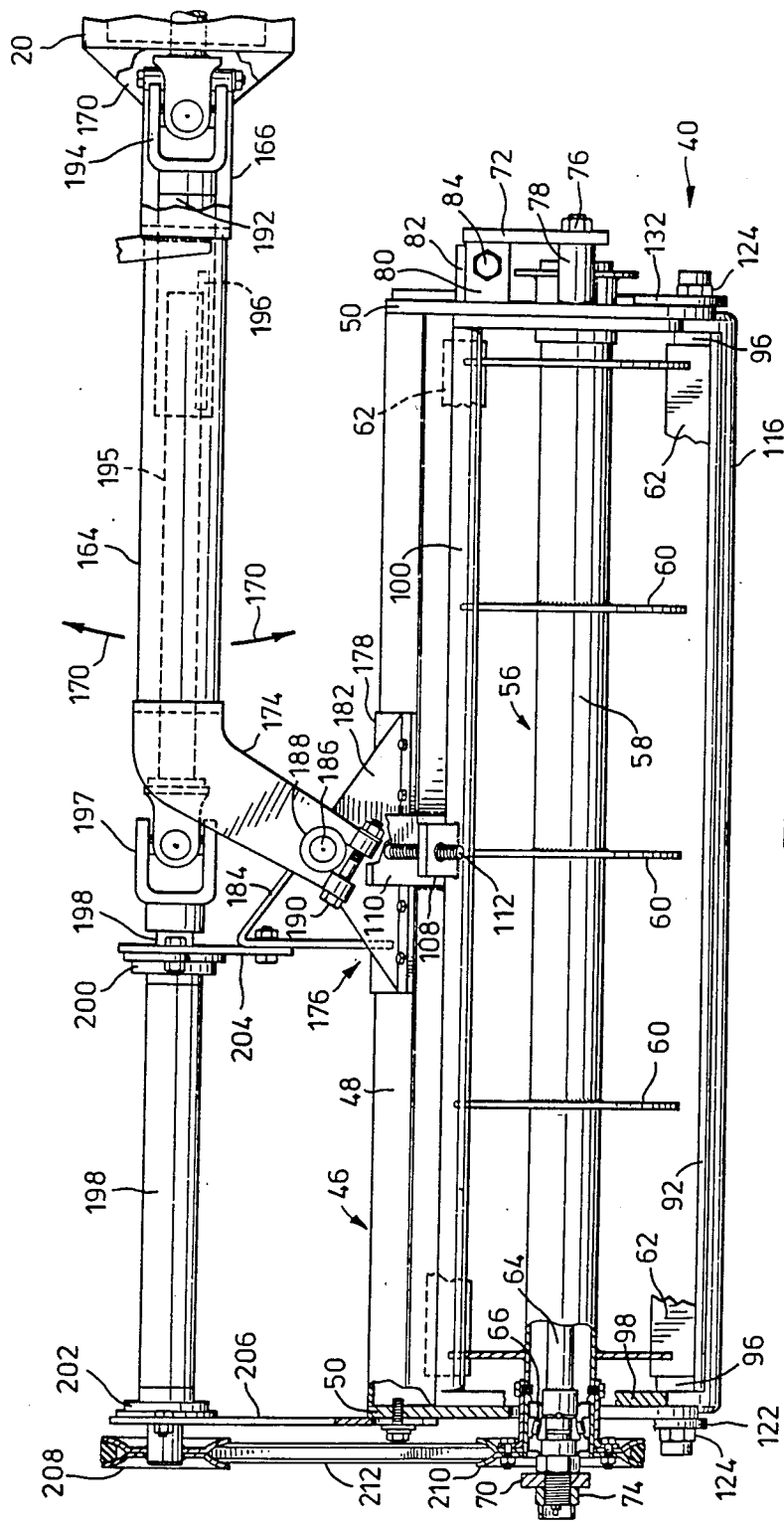
FIG. 5 is a front view of the mower of FIG. 4, looking in the direction of arrow 5 of FIG. 4 and partially cut-away.

As shown in FIGS. 1 and 5, the mower 40 is suspended by a tubular arm 164 which extends laterally outwardly from the vehicle 20, above the top of the mower and parallel to the reel axis. The inner end of arm 164 is forked at 166 and is pivoted at each side of the fork, by pivots 168, to outwardly extending plates 170 on the vehicle 20. This allows the arm 164 to swing up and down in the arc indicated by arrow 172, in order to raise the mower 40 off the ground when required.

At its outer end the arm 164 carries a downwardly extended forked bracket 174. The bracket 174 terminates over a support assembly 176 fixed to the mower top member 48. The support assembly 176 comprises an angled plate 178 bolted to the mower top member 48, a pair of upstanding parallel plates 182 welded to plate 178 and spaced apart along the direction of travel of the mower (i.e. in a direction perpendicular to the axis of reel 56), and a central V-shaped plate 184 joining the plates 182. Projecting forwardly and rearwardly from each plate 182 is a stub shaft 186.

As shown, the legs of forked bracket 174 are pivotably connected to stub shafts 186 by bearings 188 secured by clamps 190. This allows the mower to rock from side to side about the axis of shafts 186 as it follows the contours of the ground. The axis of stub shafts 186 is preferably located at the side to side balance point of the mower, so that when the mower is lifted, it will not fall to one side about shafts 186. Such balance point is usually displaced slightly outwardly of the center of the mower, because of the weight of the drive parts at the outer side of the mower. The tubular arm 164 is preferably spaced sufficiently above the mower top to allow adequate room for pivoting of the mower about shafts 186.

An inner drive shaft 192 is connected by a universal joint 194 to the drive shaft 36 of the vehicle 20. The inner drive shaft 36 extends into the tubular support arm 164 and is telescopically keyed therein, by key 196, to an intermediate drive shaft 195. The shafts 192, 195 are fitted one within the other over a substantial length so that no additional bearing is needed where they join. The outer end of shaft 195 is connected to a second universal joint 197 located just outwardly of the forked bracket 174. Such second universal joint 197 connects the intermediate drive shaft 195 to an outer drive shaft 198.

The outer drive shaft 198 is supported by inner and outer bearings 200, 202 mounted on inner and outer upstanding plates 204, 206. Inner plate 204 is bolted to the V-shaped plate 184. Outer plate 206 is bolted directly into the mower frame side plate 50.

At its outer end the outer drive shaft 198 carries a pulley 208 which is located above a corresponding pulley 210 mounted on the end of the reel shaft 64. A drive belt 212 extends between the two pulleys and is normally covered by a protective housing 214.

In use, as the mower 40 pivots about shafts 186 and as the tubular support arm 164 pivots about pivots 168, the shafts 192, 195 can telescope and the universal joints 194, 197 can bend to accommodate the changes in angle and the change in distance between outer drive shaft 198 and the vehicle drive shaft 36.

With the arrangement shown, it is found that variations in length of the grass being cut, with consequent variations in the torque applied through belt 212, cannot drive one end of the mower 40 up or down with respect to the other end. This is because the drive, as discussed, is over the top of the mower, parallel to the axis of the reel, and through a shaft which is fixed by plates 204, 206 to the top frame of the mower. In addition the mower 40 is supported against rotation about the axis of reel 56, because the tubular support arm 164 cannot rotate about its axis. (The drive shaft 198 need not however be exactly parallel to the axis of the reel. In some cases it may be desirable that it slant slightly, e.g. upwardly or downwardly, with respect to the reel axis.)

If desired, some of the force exerted by the mower 40 against the ground can be removed by a suspension spring 216 connected between upstanding arms 218 welded to the outer ends of the forks 166.

The rear mower 44 has a different mounting arrangement, shown in FIGS. 1 and 2. Here, the inner and intermediate drive shafts 192, 195 are omitted and the support assembly 176 comprises a box bracket 220 welded to plate 184. The bracket 220 houses a bearing (not shown) for outer drive shaft 198. At its inner end, drive shaft 198 carries a pulley 222 which is connected by a belt 224 to the pulley 38 in the "T" gearbox 34 of the vehicle 20.

The bracket 220 is connected to the vehicle 20 by a telescopic trailing arm 228 having an interior coil spring (not shown) therein to keep the belt 224 tensioned. The inner and outer shafts of arm 228 are rotatable relative to each other in conventional manner. The front shaft of arm 228 is connected at its front end to a fork 230 which is pivoted at 232 to the vehicle 20. Because the arm 228 is located adjacent the center of the mower 44, again changes in torque applied to the drive belt 224 will have minimal effect in pushing one end of the mower up or down.

If it is desired to permit the mowers to "float", i.e. to rotate about the axis of the reels, then the front rollers 136 are provided as shown in FIG. 3, and the mowers are mounted as follows, with reference to FIGS. 7 to 10. As shown, each mower is equipped with a top attachment bracket 234 which spans the entire width of the mower, from one side to the other. The bracket 234 has a top bar 236 and downwardly depending integral ends 238 which are pivotally mounted at 239 to the ends of the reel shaft 64, to carry the mower. Thus the entire mower, when suspended by bracket 234, is able to rotate relative to bracket 234 about the axis of reel shaft 64.

The top bar 236 of bracket 234 includes at its center forwardly and rearwardly extending stub shafts 240 which correspond to stub shafts 186. For the front mowers 40, 42 of FIG. 1 the forked bracket 174 is simply connected to stub shafts 240 on the bracket 234 instead to corresponding stub shafts 186 on the support assembly 176. The upstanding plates 204, 206 are now mounted on the bracket top bar 236 instead of on the frame top member 48. The remainder of the arrangement is the same as described for the mower 40 of FIGS. 1 to 6. In the FIG. 7 arrangement, the mower is now free to "float", i.e. to pivot about the axis of the reel, and can therefore more readily follow small undulations in the ground. With this arrangement, again variations in torque applied to the mower will not drive one end of the mower up or down with respect to the other, but increased torque will tend to depress the front of the mower slightly. However such force is exerted relatively evenly across the entire front of the mower, so that the cut produced remains uniform.

For the rear center mower 44, the box bracket 220 (FIGS. 8, 9) is simply bolted to the top bar 236 of bracket 234 by bolts 242. Again, upstanding plate 206 is mounted on the top bar 236. The rest of the mounting for rear mower 44 is the same as that shown in FIGS. 1 and 2.

Although the top attachment bracket 234 has been shown as being located directly over the mower, it can if desired be enlarged so that it extends forwardly of the mower. In this case the drive shafts for the mower will be located forwardly of the mower (although still parallel to the reel) and may if desired be lowered in height to a level well below the top of the mower, since it will be located forwardly of the mower. However the bracket which supports the mower and the drive shaft arrangement will still of course be located over the mower and pivotally connected to the ends of the mower.

I claim:
1. A mower comprising:
 (a) a frame,
 (b) a reel mounted in said frame for rotation therein,
 (c) a bed knife mounted on said frame and located behind said reel to cut grass between said reel and said bed knife,
 (d) a first upstanding support adjacent one end of said mower and extending above said frame,
 (e) a second upstanding support adjacent the center of said mower and extending above said frame,
 (f) means rigidly connecting said upstanding supports together and coupling said supports to said frame,
 (g) a drive shaft extending across the top of said mower and through said supports,
 (h) a pulley connected to said drive shaft adjacent said first support, a pulley connected to said reel and drive belt means connected between said pulleys, and
 (i) drive means connected to said drive shaft adjacent the center of said mower for rotating said drive shaft.

2. A mower according to claim 1 and including support means for said mower, said support means comprising a tubular support arm extending laterally over the top of said mower and spaced above said frame, said support arm having a forked end, and means pivotably connecting said forked end to said mower adjacent the center of said mower to allow side to side rocking of said mower about a substantially horizontal axis substantially perpendicular to said reel.

3. A mower according to claim 2 and including a second drive shaft extending through said tubular support arm, said second drive shaft being connected to said first mentioned drive shaft by a universal joint located adjacent said forked end.

4. A mower according to claim 3 wherein said forked end extends downwardly below said universal joint and said horizontal axis is located below said universal joint.

5. A mower according to claim 4 and including a support and propulsion vehicle, said tubular support arm being pivotally connected to said support and propulsion vehicle for upward and downward movement of said tubular support arm, said support and propulsion vehicle including a powered third drive shaft telescopically connected to said second drive shaft.

6. A mower according to claim 1 wherein said support means comprises a bracket extending laterally over the top of said mower, said bracket having downwardly depending arms pivotally connected to the ends of said reel to allow front to back pivoting of said mower, said upstanding supports being fixed to said bracket.

7. A mower according to claim 1 wherein said upstanding supports are fixed to said top member of said frame and said forked end is pivotably connected directly to said top member of said frame.

* * * * *